A. H. WELLINGTON.
Portable Stove.

No. 99,040.    Patented Jan. 18, 1870.

Witnesses:    Inventor:

United States Patent Office.

A. H. WELLINGTON, OF WOODSTOCK, VERMONT.

Letters Patent No. 99,040, dated January 18, 1870.

SUMMER COOKING-STOVE.

The Schedule referred to in these Letters Patent and making part of the same.

*To all whom it may concern:*

Be it known that I, A. H. WELLINGTON, of Woodstock, in the county of Windsor, and State of Vermont, have invented a new and useful Improvement in Summer Cooking-Stove; and I do hereby declare that the following is a full, clear, and exact description thereof, which will enable those skilled in the art to make and use the same, reference being had to the accompanying drawings, forming part of this specification.

This invention consists in a cylindrical chamber, provided with a grate and suitable draught-passages, and having an exit-flue so arranged that the products of combustion shall flow centrally downward through it, as will be hereinafter more fully described.

In the accompanying drawings—

Similar letters of reference indicate corresponding parts.

Figure 1:
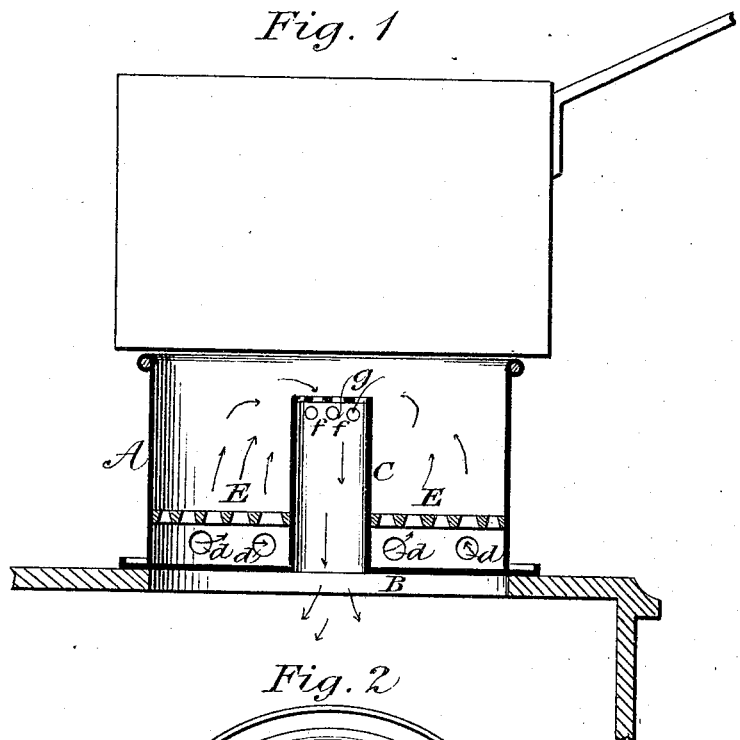
Figure 1 represents a vertical section of the article placed over an aperture of a common cooking-stove, with a vessel placed thereon, as when in use, the stove and vessel being shown in red color. The section is through the line $x$ $x$ of fig. 2.
Figure 2:
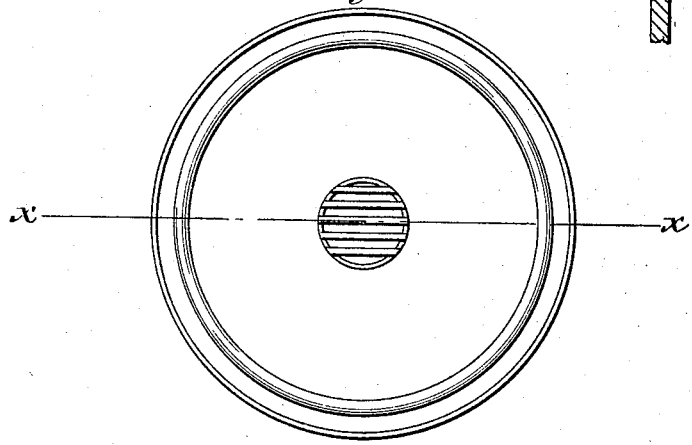
Figure 2 is a top view.

A is the summer cooking-stove, which is cylindrical in shape, and may be made of any required diameter, and of any suitable metal. It is open at the top, on which any vessel may be placed, as on an ordinary cooking-stove.

B is the bottom, and

C is a central flue, which extends to near the top, and discharges through the bottom, into the stove, as seen in the drawing.

The bottom B may extend out from the cylinder, to form a flange to rest on the stove, if desired, as seen.

$d$ represents holes through the side of the cylinder or stove, just above the bottom, for the admission of air.

The fire is contained in the annular space E around the flue C.

There may be holes through the flue C, as seen at $f$, and a grating over its top, as seen at $g$; but I do not deem either indispensable.

The heat ascends and strikes the bottom of the vessel, and then the smoke and gaseous products of combustion enter the flue C and descend, being drawn downward by the draught of the stove, and so into the chimney.

By this arrangement, the fire necessary for the ordinary cooking of a family, is brought into a very small space, so that all the heat is used for the purposes intended.

It may be made of either cast or sheet-metal, as may be deemed most advisable.

Having thus described my invention,

What I claim as new, and desire to secure by Letters Patent, is—

The summer cooking-stove, herein described, consisting essentially of the cylindrical chamber A, draught-passages $d$, and centrally-arranged exit-flue C, substantially as set forth.

The above specification of my invention signed by me, this 17th day of October, 1868.

A. H. WELLINGTON.

Witnesses:
WILLIAM E. JOHNSON,
HOSEA V. FRENCH.